United States Patent
Robertson

(10) Patent No.: US 11,053,017 B1
(45) Date of Patent: Jul. 6, 2021

(54) ROTOR NOISE REDUCTION USING SIGNAL PROCESSING

(71) Applicant: Kitty Hawk Corporation, Palo Alto, CA (US)

(72) Inventor: Cameron Robertson, San Mateo, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

(21) Appl. No.: 16/998,241

(22) Filed: Aug. 20, 2020

(51) Int. Cl.
| | |
|---|---|
| G01C 23/00 | (2006.01) |
| G05D 1/00 | (2006.01) |
| G05D 3/00 | (2006.01) |
| G06F 7/00 | (2006.01) |
| G06F 17/00 | (2019.01) |
| B64D 31/06 | (2006.01) |
| B64C 29/00 | (2006.01) |
| H02P 23/06 | (2016.01) |
| G10K 11/175 | (2006.01) |

(52) U.S. Cl.
CPC .......... B64D 31/06 (2013.01); B64C 29/0025 (2013.01); G10K 11/1752 (2020.05); H02P 23/06 (2013.01)

(58) Field of Classification Search
CPC ............... B64D 31/06; B64C 29/0025; G10K 11/1752; H02P 23/06
See application file for complete search history.

(56) References Cited

U.S. PATENT DOCUMENTS

| | | | | |
|---|---|---|---|---|
| 8,439,640 | B2 * | 5/2013 | Arel | B64C 11/40 |
| | | | | 416/117 |
| 10,210,856 | B1 * | 2/2019 | Hefner | G10K 11/175 |
| 2013/0020429 | A1 * | 1/2013 | Kroo | B64D 31/00 |
| | | | | 244/6 |
| 2015/0028151 | A1 * | 1/2015 | Bevirt | B64D 27/24 |
| | | | | 244/6 |
| 2018/0215462 | A1 * | 8/2018 | Fenny | B64D 31/00 |
| 2018/0305005 | A1 * | 10/2018 | Parks | B64D 27/24 |
| 2019/0256201 | A1 * | 8/2019 | Plekhanov | B64C 27/08 |
| 2019/0291856 | A1 * | 9/2019 | Kaufman | B64C 27/473 |
| 2019/0337613 | A1 * | 11/2019 | Villa | B64C 9/00 |
| 2020/0164972 | A1 * | 5/2020 | Kiesewetter | B64C 27/28 |
| 2020/0354048 | A1 * | 11/2020 | Melo | B64C 29/0025 |

* cited by examiner

Primary Examiner — Mussa A Shaawat
(74) Attorney, Agent, or Firm — Van Pelt, Yi & James LLP

(57) ABSTRACT

A vehicle which includes a flight controller that is configured to receive one or more desired forces or moments associated with a plurality of rotors in the vehicle and determine a plurality of motor control signals for the plurality of rotors based at least in part on the desired forces or moments and an expected rotor noise produced by at least one of the plurality of rotors. The vehicle further includes the plurality of rotors, where the plurality of motor control signals is used to control the plurality of rotors.

15 Claims, 12 Drawing Sheets

ROTOR NOISE REDUCTION USING SIGNAL PROCESSING

BACKGROUND OF THE INVENTION

New types of aircraft are being developed with relatively small footprints and vertical takeoff and landing capabilities. These features free such vehicles from having to take off from and land on long runways and permit usage in new environments. However, the usage of a vehicle in a new environment may expose new problems, and systems and/or techniques which solve these new problems would be desirable. It would be especially desirable if such solutions were lightweight.

BRIEF DESCRIPTION OF THE DRAWINGS

Various embodiments of the invention are disclosed in the following detailed description and the accompanying drawings.

DETAILED DESCRIPTION

Figure 1:
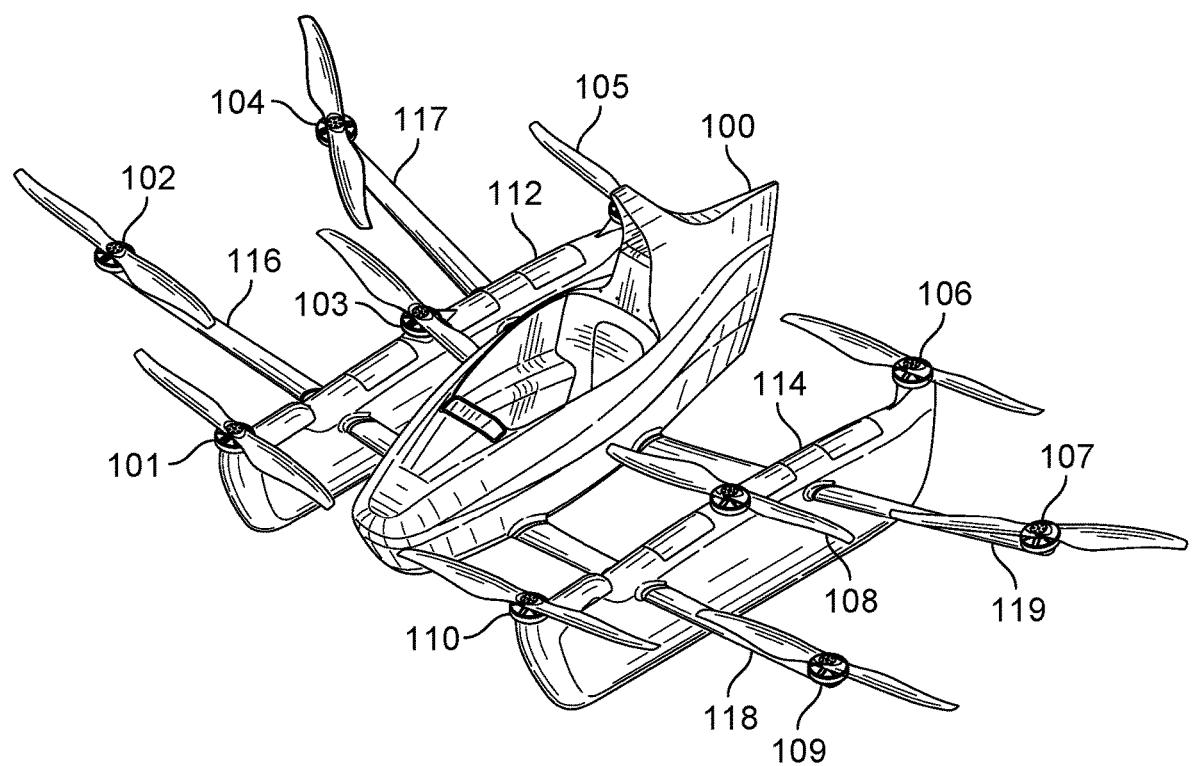
FIG. 1 is a diagram illustrating an embodiment of a vertical takeoff and landing (VTOL) vehicle.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a noise-reduction technique are described herein. In some embodiments, a noise-reduction process includes receiving one or more desired forces or moments associated with a plurality of rotors in a vehicle. For example, the vehicle may be a vertical takeoff and landing (VTOL) multicopter with rotors attached to the vehicle at fixed positions. A plurality of motor control signals may be determined for the plurality of rotors based at least in part on the desired forces or moments and an expected rotor noise produced by at least one of the plurality of rotors. In contrast, other techniques do not take the noise produced by the rotors into account when generating the motor control signals. The plurality of rotors is then controlled using the plurality of motor control signals (e.g., where the noise produced by the rotors is less than it would be if the motor control signals were generated without taking expected rotor noise into consideration). For example, the sound waves produced by a first rotor and a second rotor may combine in a destructive manner and/or the sound waves produced by a first rotor and a second rotor have "peaks" (i.e., global or local maxima) at frequencies that are separated or deconflicted to whiten the noise and/or reduce the magnitude of the combined peaks/maxima.

FIG. 1 is a diagram illustrating an embodiment of a vertical takeoff and landing (VTOL) vehicle. In the example shown, the VTOL vehicle (100) is a single-occupant multicopter with 10 rotors: five rotors on the left (port) side (i.e., rotors 106-110) and five rotors on the right (starboard) side (i.e., rotors 101-105). Six of the rotors (101, 103, 105, 106, 108, and 110) are inboard rotors that are disposed on the top of the floats (112 and 114) closer to the fuselage. The other four rotors (102, 104, 107, and 109) are outboard rotors that are located on the distal ends of the booms (116-119) that extend outward from the fuselage and pass through the floats.

In this example, the vehicle is relatively small which is beneficial for a number of reasons. For example, the relatively small size of the vehicle permits it to fit into a standard width trailer or on a flatbed (e.g., "wingtip" first, with outboard rotors 102 (109) and 104 (107) first) or for easy transport. Furthermore, the relatively small size of the vehicle and the vehicle's vertical takeoff and landing capabilities permit the vehicle to take off and land in more densely populated and/or urban environments without the need for a long runway. For example, instead of having to take off from and land in an airport with a long runway, the VTOL vehicle shown here may take off and land in parking lots, parks, rooftops, and so on in a city. In this example, each rotor has two blades with a diameter of ~50 inches. A diameter of this size may correspond to the largest diameter possible for a 10 rotor configuration within the constraints of the desired multicopter dimensions (e.g., fits into a standard width trailer).

In one example flight, the multicopter takes off vertically until a desired altitude is reached. The pilot may then rotate the vehicle (e.g., while hovering at the same altitude) about a vertical or yaw axis (not shown here) so that the multicopter is facing or pointing in some desired direction (e.g., toward a desired destination). The multicopter then flies forward, maintaining a constant altitude until the multicopter approaches a desired landing site (e.g., over water or on land). The pilot may slow the forward movement of the multicopter, coming to a forward stop generally above the desired landing site while still hovering and maintaining a constant altitude. The multicopter then lands by descending vertically.

The rotors are mounted to the multicopter at a fixed roll angle and a fixed pitch angle. That is, the rotors cannot change their tilt positions. To maneuver, each rotor is independently controllable (e.g., different amounts of torque can be applied to each rotor), such that each rotor can rotate at a different speed or output a different thrust or torque.

One impediment to using such a vehicle in an urban and/or more densely populated area is the noise produced by the vehicle. In particular, much of the noise produced by the vehicle is dominated by the noise produced by the rotors. The following figure shows an example spectrum of rotor noise.

Figure 2:
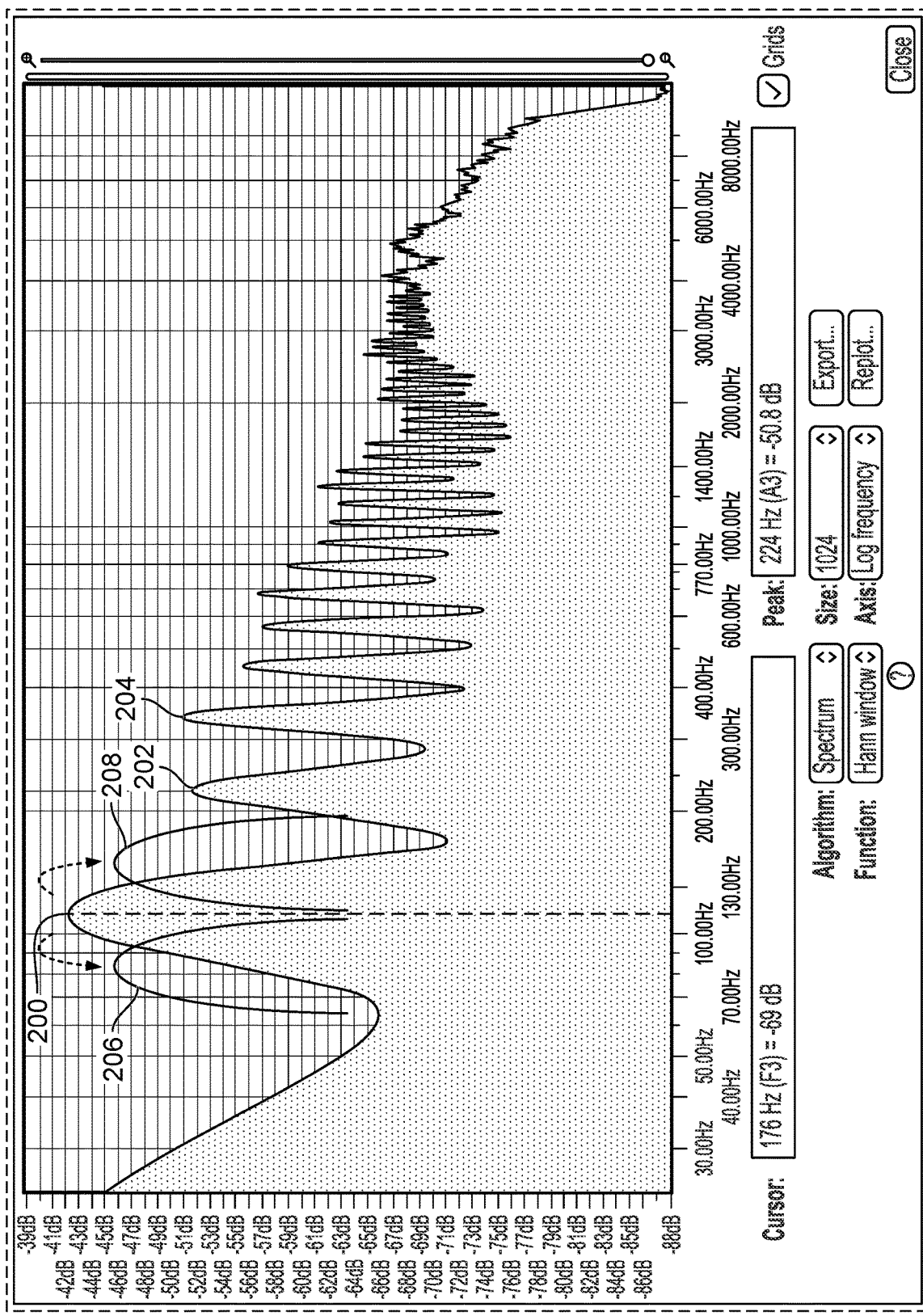
FIG. 2 is a spectrum illustrating an embodiment of rotor noise produced by a rotating rotor.

FIG. 2 is a spectrum illustrating an embodiment of rotor noise produced by a rotating rotor. For simplicity and ease of explanation, the example spectrum shown here is associated with a noise from a single rotor rotating at a constant (rotational) speed and/or generating a constant amount of thrust or torque. The rotor noise spectrum has a global maximum (200) with a frequency that depends upon rotational speed of the rotor (i.e., the blade passage frequency). For example, increasing the (rotational) speed of the rotor causes the frequency of the global maximum (200) to correspondingly increase and decreasing the rotational speed of the rotor causes a corresponding decrease in the frequency of the global maximum (200).

The rotor noise spectrum also includes local minima associated with harmonics (e.g., second harmonic 202 and third harmonic 204). The frequencies of the harmonics depend upon the base frequency of the global maximum (200) such that shifting the frequency of the global maximum (200) will cause the frequencies of the harmonics to shift. In this example, the global maximum (200) is at a frequency of 112 Hz, the second harmonic (202) is at a frequency of 224 Hz, the third harmonic is at frequency of 336 Hz, and so on.

Various embodiments of a technique are described herein to reduce rotor noise and/or make the rotor noise less annoying or damaging by taking into account expected noise produced by one or more rotors when generating motor control signals which control the (rotational) speed of the rotors. For example, suppose that the VTOL vehicle (100) shown in FIG. 1 is hovering in the air such that the rotors are rotating at a relatively constant rotational speed and/or are generating a relatively constant amount of thrust or torque. With traditional techniques, each rotor will rotate on average at the same rotational speed as its counterpart rotor (e.g., about the longitudinal axis) to keep the vehicle hovering in the air in the same position. For example, the left forward inboard rotor (110) and the right forward inboard rotor (101) rotate at the same rotational speed.

Returning to FIG. 2, suppose that the example noise spectrum is now associated with two rotors (e.g., the left forward inboard rotor (110) and the right forward inboard rotor (101)). If the two rotors are rotating at the same rotational speed (e.g., per traditional techniques that do not take noise into account), then the global maximum (200) will be relatively large because both of the rotors in question are rotating at the same frequency and constructively contribute to the global maximum (200).

However, suppose that the motor control signals to the two rotors in question were adjusted so that one rotor rotated at a slightly slower frequency and the other rotor rotated at a slightly faster frequency (as an example). This would produce a first maximum (206) at a slightly lower frequency and lower magnitude as well as a second maximum (208) at a slightly higher frequency and lower magnitude, respectively, compared to (original) maximum 200.

In some cases, the sound waves produced by the exemplary slightly-slower rotor and slightly-faster rotor destructively combine so that the noise spectrum is flattened and whitened (i.e., the magnitude of the peaks or maxima is reduced while the frequency range is widened, respectively) and occasionally the sound waves from the two rotors may destructively interfere. The effect would be replicated in the harmonics but is not shown here to preserve the readability of the figure (e.g., second harmonic 202 and third harmonic 204 would similarly each devolve into two peaks or maxima with lower magnitudes and a widened and/or whitened frequency range compared to the original, single peak or maximum).

This technique for generating motor control signals that take into account the noise produced by the rotors is described more generally and/or formally below.

Figure 3:
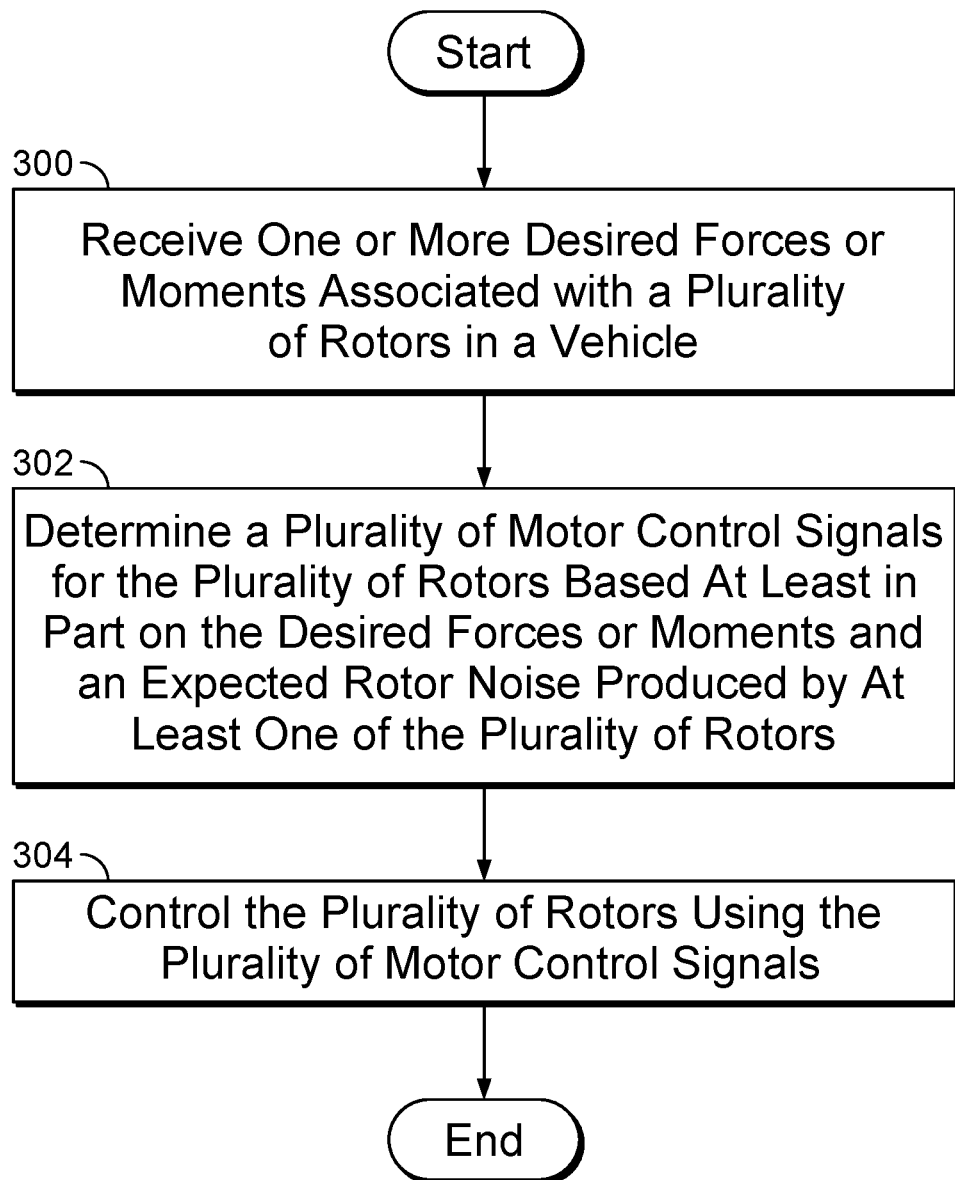
FIG. 3 is a flowchart illustrating an embodiment of a process to generate motor control signals, including by taking into account expected noise produced by one or more rotors.

FIG. 3 is a flowchart illustrating an embodiment of a process to generate motor control signals, including by taking into account expected noise produced by one or more rotors. In some embodiments, the process is performed by a flight controller (or, more specifically, a thrust allocator within a flight controller). For example, with this technique, the rotor noise produced by VTOL vehicle 100 shown in FIG. 1 may be quieter and/or less annoying.

At 300, one or more desired forces or moments associated with a plurality of rotors in a vehicle are received. For example, a desired roll force ($F_x$), a desired pitch force ($F_y$), and a desired yaw moment ($M_z$) may be received at step 300.

At 302, a plurality of motor control signals for the plurality of rotors is determined based at least in part on the desired forces or moments and an expected rotor noise produced by at least one of the plurality of rotors. Traditionally, a thrust allocator determines motor control values that achieve the desired forces and/or moments without taking into consideration the expected noise produced by the rotors. In this example, the thrust allocator takes expected noise produced by the rotors into account in addition to desired force(s) or moment(s) into when determining the motor control signals. As described above, this may cause the sound wave from one rotor to destructively combine with the sound wave from another rotor and/or whiten the noise profile (e.g., so that the magnitude of a peak or maximum is reduced and/or the width or frequency range of a peak or maximum is increased). In some embodiments, two rotors are forced to be or kept at a fixed phase difference in order to induce destructive interference (e.g., phase locked rotors). The specific phase difference that is maintained between the phase locked rotors depends upon the number of rotor blades. For example, for the two-bladed rotors shown in the example of FIG. 1, a 90° phase difference would be maintained.

At 304, the plurality of rotors is controlled using the plurality of motor control signals. For example, in FIG. 1, the respective motor controls are sent to the 10 motor controllers that control the 10 motors which cause 10 rotors (101-110) to rotate on the multicopter. As described above, the rotor noise produced is quieter, less damaging, and/or less annoying compared to the rotor noise that would be produced if the motor control signals were generated without taking noise into account.

In some applications, the noise reduction techniques described herein are desirable because the noise from the rotors may be annoying or damaging to the hearing of people in the vicinity of the vehicle. By reducing or at least making the rotor noise more bearable and/or safer, it may make the usage of vehicles (such as VTOL vehicle 100 shown in FIG. 1) more acceptable in populated areas such as cities.

Another benefit to the noise-reduction techniques described herein is that they reduce noise without adding significant weight to the vehicle (e.g., the changes may be implemented in a flight controller or thrust allocation by updating the firmware or using a new FPGA or ASIC) and/or changing the aerodynamics of the vehicle. In contrast, some other noise reduction techniques require physical sound dampeners which may add to the weight or increase the drag of the vehicle.

There are a number of ways in which the noise reduction process of FIG. 3 may be performed. The following figures describe some examples.

Figure 4A:
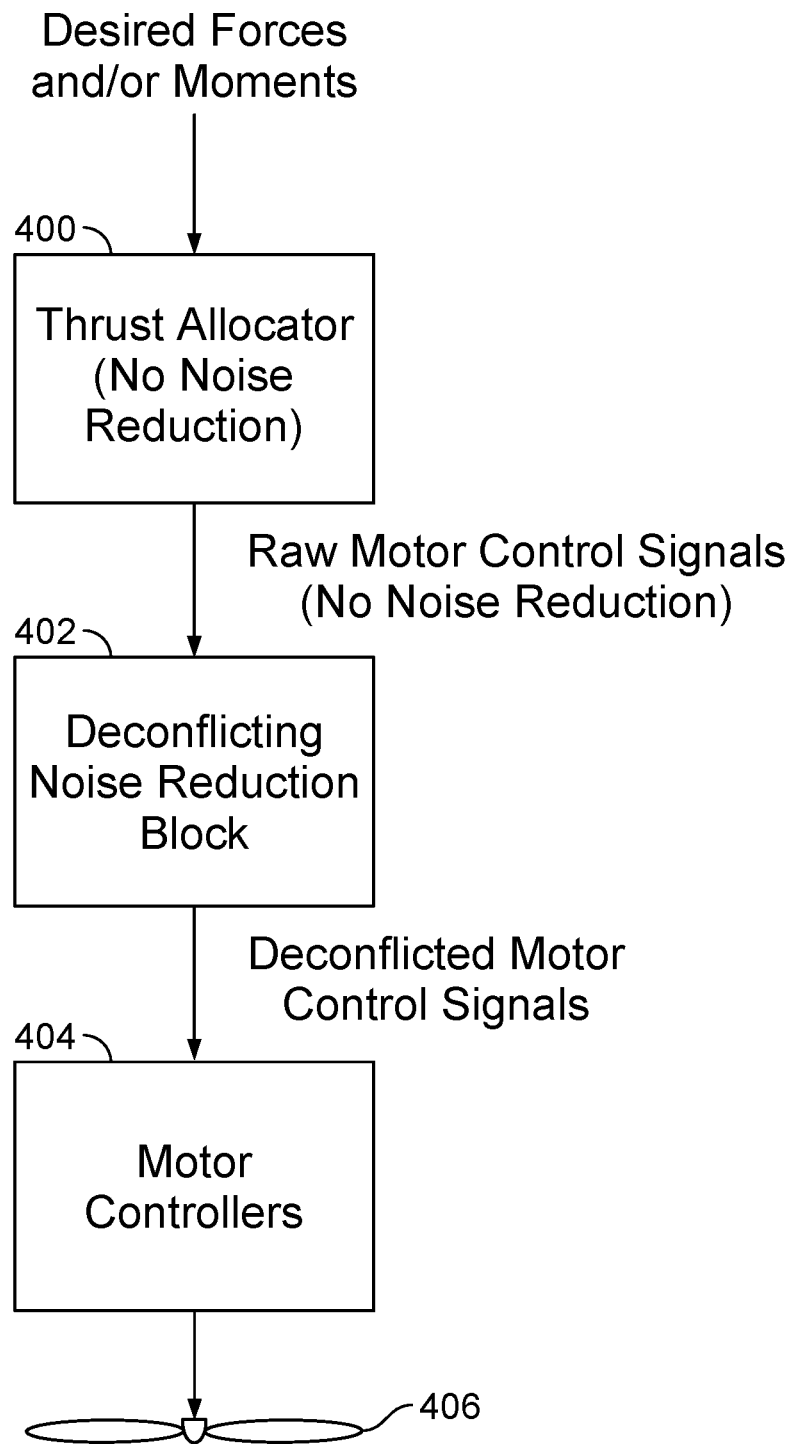
FIG. 4A is a block diagram illustrating an embodiment of a flight controller that reduces noise using deconfliction.

FIG. 4A is a block diagram illustrating an embodiment of a flight controller that reduces noise using deconfliction. In this example, the blocks shown here (e.g., the thrust allocator (400), the deconflicting noise reduction block (402), etc.) are included in a flight controller or other avionics. In some applications, it is desirable to perform noise reduction (e.g., by controlling or otherwise adjusting the motor control signals) without making any changes to an existing thrust allocation block or component. For example, this may permit this noise reduction technique to be easily implemented in an existing vehicle and/or using existing parts without having to perform a full redesign. This is one example of how the process of FIG. 3 may be implemented in such a manner. In some applications, this embodiment is desirable because it is less processor intensive or computing resource intensive compared to some other implementations or embodiments.

In this example, a thrust allocator (400) receives desired forces and/or moments (e.g., $F_x$, $F_y$, and $M_z$). The thrust allocator (400) generates (raw) motor control signals with no noise reduction, for example, without taking into account the expected rotor noise. For example, the thrust allocator (400) may generate motor controls signals that produce the desired forces and moments and with the largest (e.g., control) margin, but not take into account the noise produced by the rotors. In other systems that do not perform the noise reduction techniques described herein, these raw motor control signals would be passed to the rotors (e.g., without any noise reduction).

The raw motor controls signals (i.e., without noise reduction) are passed from the thrust allocator (400) to a noise reduction block (402) that uses deconfliction to reduce rotor noise. In this example, the deconflicting noise reduction block (402) performs deconfliction on one or more pairs of raw motor controls signals associated with pairs of rotors. The following figure shows an example of this.

Figure 4B:
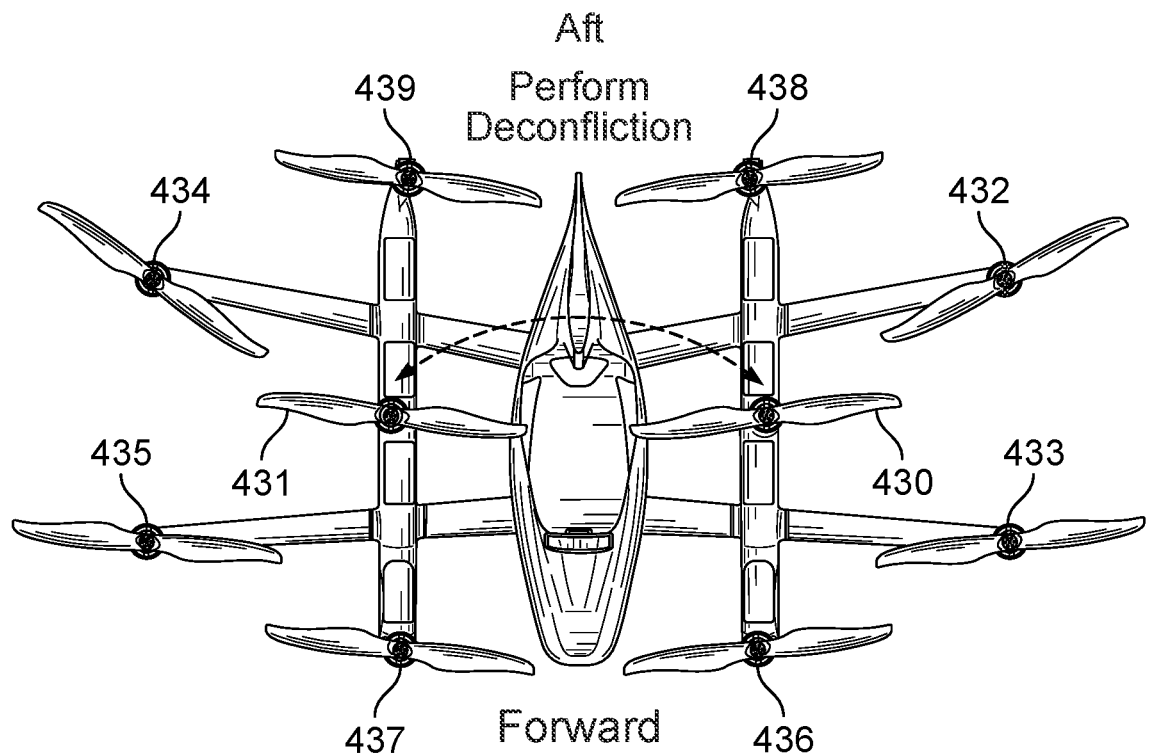
FIG. 4B is a diagram illustrating an embodiment of a center inboard rotors upon which deconfliction is performed.

FIG. 4B is a diagram illustrating an embodiment of a center inboard rotors upon which deconfliction is performed. In the example shown, deconfliction is performed on the left center inboard rotor (430) and the right center inboard rotor (431) because those rotors are better candidates to perform deconfliction on compared to the other rotors in the exemplar multicopter for the following reasons.

TABLE 1

Rotors in FIG. 4B and their relative attractiveness for use in noise reduction.

| Rotor | In FIG. 4B | Comments |
| --- | --- | --- |
| Outboard Rotors | Rotors 432-435 | Main source of roll control (less attractive for noise reduction) |
| Forward Inboard Rotors | Rotors 436 and 437 | Main source of pitch control (less attractive for noise reduction) |
| Aft Inboard Rotors | Rotors 438 and 439 | Main source of pitch control (less attractive for noise reduction) |
| Center Inboard Rotors | Rotors 430 and 431 | Secondary source of pitch and roll control (more attractive for noise reduction) |

The outboard rotors (432-435) are located the furthest from the roll axis and therefore provide the most roll control. As such, those rotors may be less attractive for deconfliction (and noise reduction in general, including other types of noise reduction performed using the motor control signals) because using those rotors for noise reduction may reduce the available roll control and at least in some cases or applications this is undesirable (e.g., if there is only a little control margin due to environment conditions (e.g., a strong crosswind versus no wind) and/or the current demands of the flight path (e.g., very active maneuvering versus hovering in place). Similarly, the forward inboard rotors (436 and 437) and the aft inboard rotors (438 and 439) provide the most pitch control and similarly may be unattractive candidates for noise reduction, at least in some applications or cases.

In contrast, the center inboard rotors (430 and 431), do not provide as much roll control or pitch control as the other rotors described above and therefore may be better candidates for deconfliction or noise reduction in general. As such, deconfliction is performed on those two rotors in this example. Although deconfliction is performed on the center inboard rotors (430 and 431) in this example, in some other embodiments deconfliction (or noise reduction in general) is performed on some other pair of rotors in addition to or as an alternative to the center inboard rotors. For example, as will be described in more detail below, if there is sufficient control margin and if the vehicle is in some sort of known or steady state mode where the control margin is expected to remain sufficiently high (e.g., during takeoff or landing when there is little or no crosswind), it may be safe or acceptable to perform deconfliction on other pairs of rotors (e.g., the front inboard rotors).

Returning briefly to FIG. 4A, the deconflicting noise reduction block (402) compares two (raw) motor control signals (e.g., associated with center inboard rotors 430 and 431), to determine if those (raw) motor control signals are associated with or have values that are less than or are otherwise within a threshold difference (e.g., the motor control signals are too close). If so, a first and a second deconflicted motor signal are generated by modifying at least one of the first raw motor control signal or the second raw motor control signal to have at least the threshold difference. Conceptually, this is like having two motor control signals at maximum 200 shown in FIG. 2 being deconflicted or otherwise separated into a first (noise-reduced and/or deconflicted) motor control signal represented by maximum 206 and a second (noise-reduced and/or deconflicted) motor control signal represented by maximum 208. Naturally, if there is a sufficient separation or difference between the two raw motor control signals then the signals may be left unmodified. An example of this deconfliction process as a function of time is shown in the following figure.

Figure 4C:
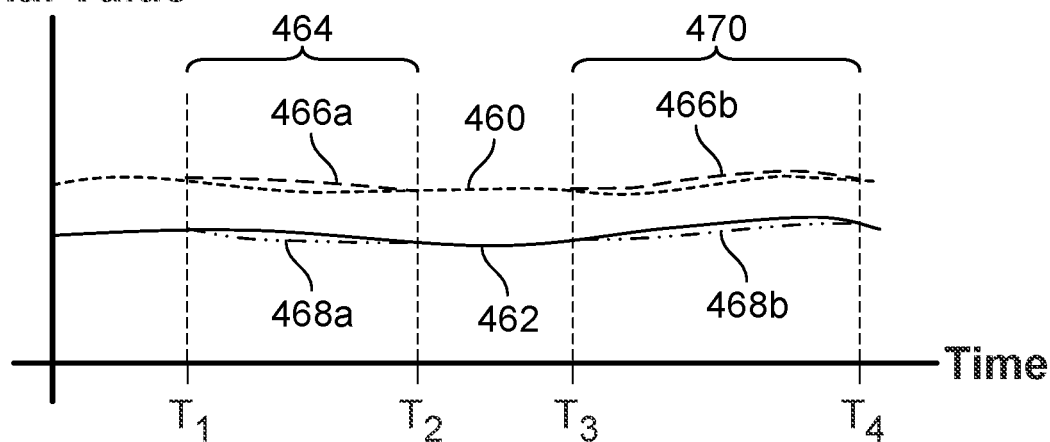
FIG. 4C is a graph showing an embodiment of deconfliction performed on a pair of raw motor control signals.

FIG. 4C is a graph showing an embodiment of deconfliction performed on a pair of raw motor control signals. To preserve the readability of the diagram, the deconflicted motor control signals (466a, 466b, 468a, and 468b) are only shown for the periods of time (e.g., periods 464 and 470) where those signals differ from the raw motor control signals (460 and 462). During other periods of time, the deconflicted motor control signals have the same value as the raw motor control signals but are not shown to preserve the readability of the diagram.

In this example, signal 460 is the raw motor control signal for a first rotor (e.g., left center inboard rotor 430 in FIG. 4B) and signal 462 is the raw motor control signal for a second rotor (e.g., right center inboard rotor 431 in FIG. 4B). The two raw motor control signals being deconflicted are compared and during the period 464 (beginning at time $T_1$ and ending at time $T_2$), the signals are within a threshold difference. In response, the signals are deconflicted by increasing the value of the first raw signal (460) and decreasing the value of the other raw signal (462) during that time period to produce deconflicted motor controls signals (466a and 468a) for the first and second rotor, respectively. For example, the deconflicted motor controls signals (466a and 468a) in that period (464) may have a difference that is greater than or equal to the threshold difference.

Similarly, during the period (470) beginning at time $T_3$ and ending at time $T_4$, the raw motor control signals (460 and 462) are within the threshold difference. As such, the raw signals are deconflicted by increasing the difference between those signals during that period (470) to produce the deconflicted motor control signals (466b and 468b).

Returning briefly to FIG. 4A, the deconflicted motor control signals output by deconfliction noise reduction block (402) are passed to the motor controllers (404) which in turn use those signals to control the rotors (406).

Although the above example showed noise reduction (or, more specifically, deconfliction) performed as a separate step after thrust allocation, noise reduction may be integrated into the thrust allocation process instead of being performed post-thrust allocation. The following figures show an example of this.

Figure 5A:
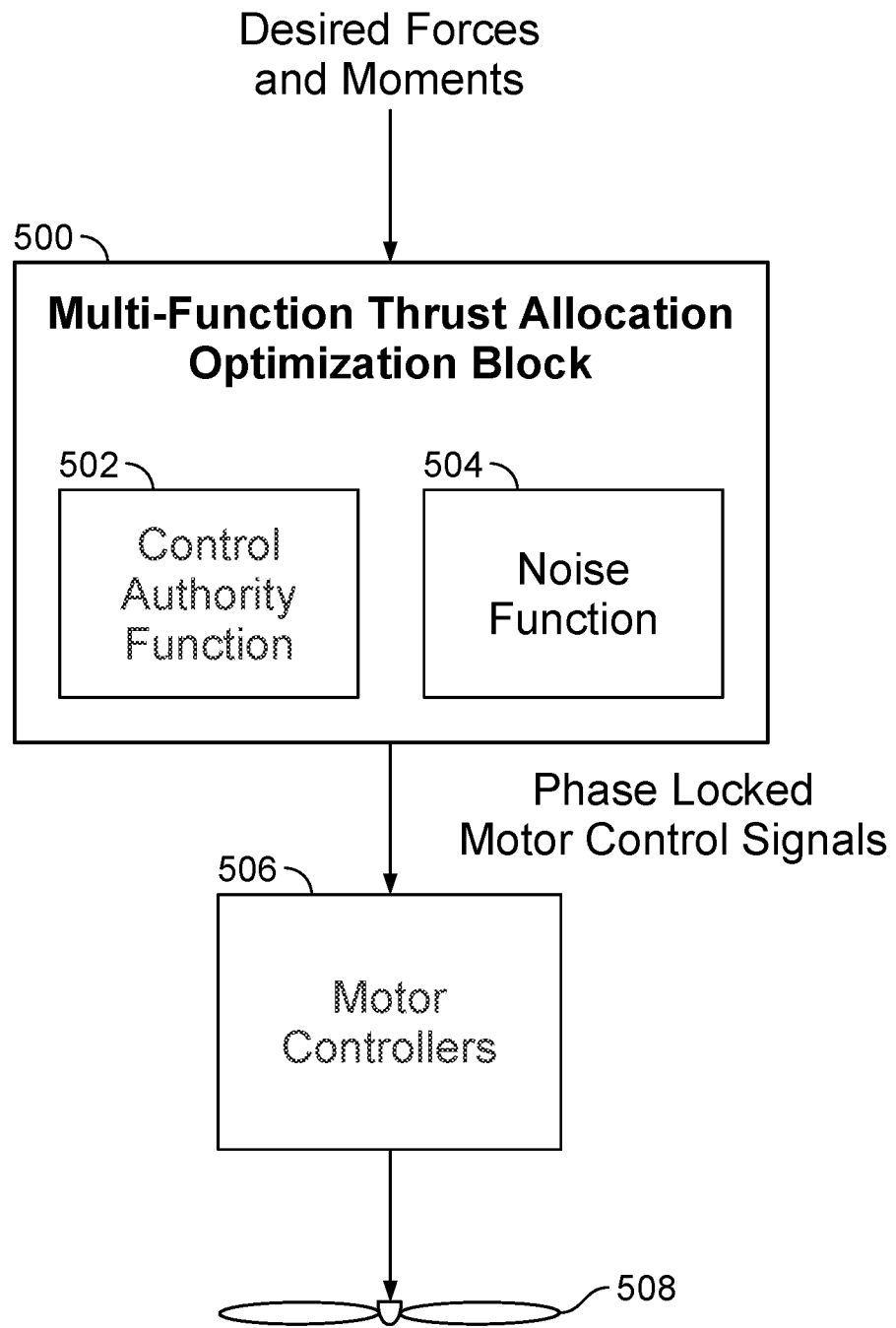
FIG. 5A is a block diagram illustrating an embodiment of a flight controller that simultaneously optimizes multiple functions, including control authority and a noise function where rotors are phase locked to reduce noise.

FIG. 5A is a block diagram illustrating an embodiment of a flight controller that simultaneously optimizes multiple functions, including control authority and a noise function where rotors are phase locked to reduce noise. For convenience, this example shows a multi-function thrust allocation optimization block (500) in combination with phase locked pairs of rotors but it is noted that these two techniques do not need to be used together. In some embodiments, a flight controller is implemented as shown. In this example, a multi-function thrust allocation optimization block (500) considers multiple (e.g., cost) functions when generating motor control signals where the two functions considered are the control authority function (502) and a noise function (504). Conceptually, the thrust allocator (500) will attempt to find motor control signals that achieve the desired forces and moments that are input to the thrust allocator (500) and that optimize the control authority function (e.g., maximizes the control margin) as well as the noise function (e.g., minimizes the noise produced by the rotors). The following figure shows the phased locked pairs that are considered.

Figure 5B:
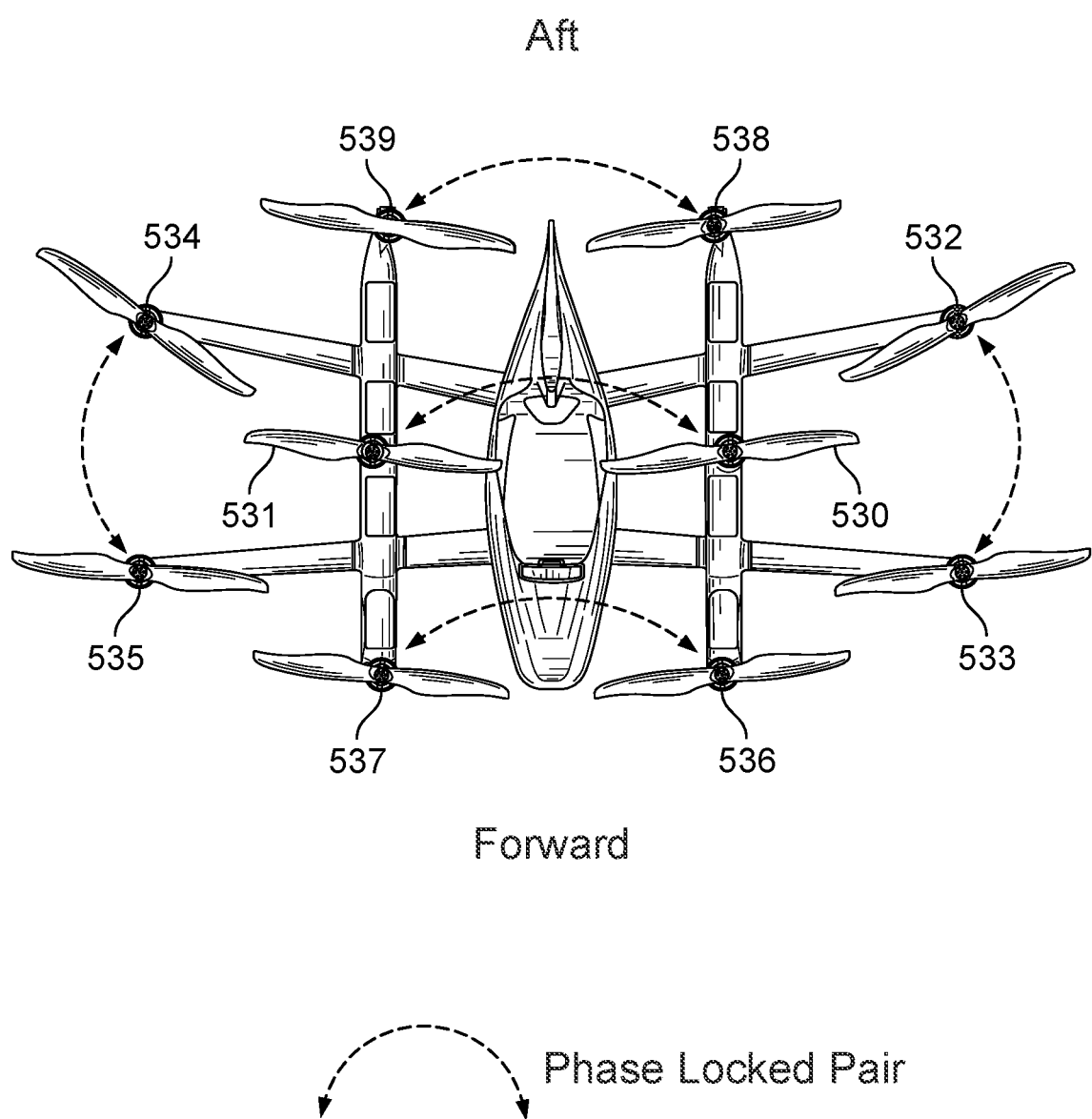
FIG. 5B is a diagram illustrating an embodiment of a phase locked pairs in a multicopter.

FIG. 5B is a diagram illustrating an embodiment of a phase locked pairs in a multicopter. In the example shown, each rotor in the exemplary multicopter shown is part of a phase locked pair where (e.g., control margin permitting) the two rotors are phase locked (e.g., constrained to have the same speed, thrust, or torque value, but with a fixed or locked (e.g., 90°) phase difference so that the sound waves produced by the two phase locked rotors destructively interfere with each other. In other words, a pair of phase locked rotors are issued the same (e.g., RPM) commands and the corresponding motor controllers must control the paired rotors as needed to maintain the phasing of the paired rotors. In this example, the left outboard rotors (532 and 533), the right outboard rotors (534 and 535), the forward inboard rotors (536 and 537), the aft inboard rotors (538 and 539), and the center inboard rotors (530 and 531) are phase locked pairs. In order for the phase locked pairs to more effectively cancel each other out, it may be desirable for a phase locked pair to be located relatively close to each other. As such, it may be desirable for the left outboard rotors (532 and 533) and the right outboard rotors (534 and 535) to be paired together, respectively, as opposed to the forward outboard rotors (533 and 535) and the aft outboard rotors (532 and 534) forming phase locked pairs.

Returning to FIG. 5A, the multi-function thrust allocation optimization block (500) will consider (for example) whether the control authority function (502) and the noise function (504) are sufficiently optimized if some or all of the rotors are phase locked. If both (e.g., cost) functions are not able to be sufficiently optimized (e.g., there is insufficient control authority if all rotors are phase locked), then the thrust allocation optimization block (500) will consider or otherwise evaluate other combinations of phase locked and non-phase locked rotors are and find motor controls signals that satisfy both the control authority function (502) and the noise function (504).

The phase locked motor control signals (e.g., which include at least one pair of rotors that are phase locked and where a phase locked state versus a non-phase locked state is controllable using some management or configuration signal) output by the multi-function thrust allocation optimization block (500), which as described above may include periods of time where some rotors are not phase locked with their counterpart rotor, are passed to the motor controllers (506) which use those motor control signals to control the rotors (508).

It is noted that the phase locked pairs in FIG. 5B are possible or potential pairs of phase locked rotors and at some times the flight controller or thrust allocator may choose to only enforce phase locking on certain or selected pairs or sets of rotors/motors (e.g., based on the control authority function (502) and noise function (504) in FIG. 5A). For example, it may not be worthwhile to phase lock a given pair of rotors that only slightly reduces noise but is very costly with respect to reduced control authority.

Depending upon the application, the embodiment described in FIGS. 4A-4C may be more desirable compared to the embodiment described in FIGS. 5A and 5B and vice versa. For example, one benefit to the multi-function thrust allocation optimization approach shown in FIGS. 5A and 5B is that the produced motor control signals are better able to produce the desired forces and moments. For example, even though the changes introduced by the deconflicting noise resolution block (e.g., 402 in FIG. 4A) may be relatively small, they may cause the resulting forces and moments to deviate from the desired forces and moments whereas the raw or unmodified motor control signals may have produced the desired forces and moments. By applying or considering thrust and noise considerations simultaneously (e.g., simultaneously in a single block, such as block 500 in FIG. 5A), a better global optimum set of controls (e.g., for thrust and noise) is produced compared to applying or otherwise considering those considerations sequentially (e.g., in blocks 400 and 402 in FIG. 4A).

However, the multi-function thrust allocation optimization approach shown in FIGS. 5A and 5B is very processor intensive and requires more computing or processing resources than the embodiment shown in FIGS. 4A-4C. To put it another way, the post-thrust allocation, deconfliction technique shown in FIGS. 4A-4C may be easier to implement and/or not as processing intensive and in some applications this approach is desirable.

Although the examples described above show deconfliction in combination with post-thrust allocation noise reduction and phase locking in combination with a multi-function thrust allocation optimization block, some other embodiments use different combinations of techniques. For example, instead of having the multi-function thrust allocation optimization block (500) in FIG. 5A consider phase locked rotors, in some embodiments, that block may consider deconflicted pairs of rotors (e.g., where paired rotors are sent RPM-deconflicted rotor commands). Or, a phase locking approach may be used but instead of a full-blown multi-function thrust allocation optimization block, a simpler thrust allocation block is used where the phase locking is implemented or enforced as a constraint on and/or fixed or defined relationship during the thrust allocation (e.g., paired rotors must be issued the same thrust commands (e.g., same RPM) and the 90° phase relationship of the pair must be maintained, for example by the motor controllers adjusting their control signal sent to the motors as/if needed). In general, techniques described in these examples may be used in some other combination than is described herein.

Depending upon a variety of factors (e.g., flight conditions, environmental conditions, etc.) there may be certain times or situations when it is desirable to not perform noise reduction so that other, more important considerations can be satisfied (e.g., keeping the aircraft airborne). The following figures describe some examples of necessary conditions or states that must be satisfied in order for noise reduction to be performed (or at least contemplated). If not, noise reduction is not performed (e.g., the motor control signals are generated without taking into rotor noise into account). First, a location-based example is described. Then, some example necessary conditions that must be met in order for noise reduction to even be considered are described.

Figure 6A:
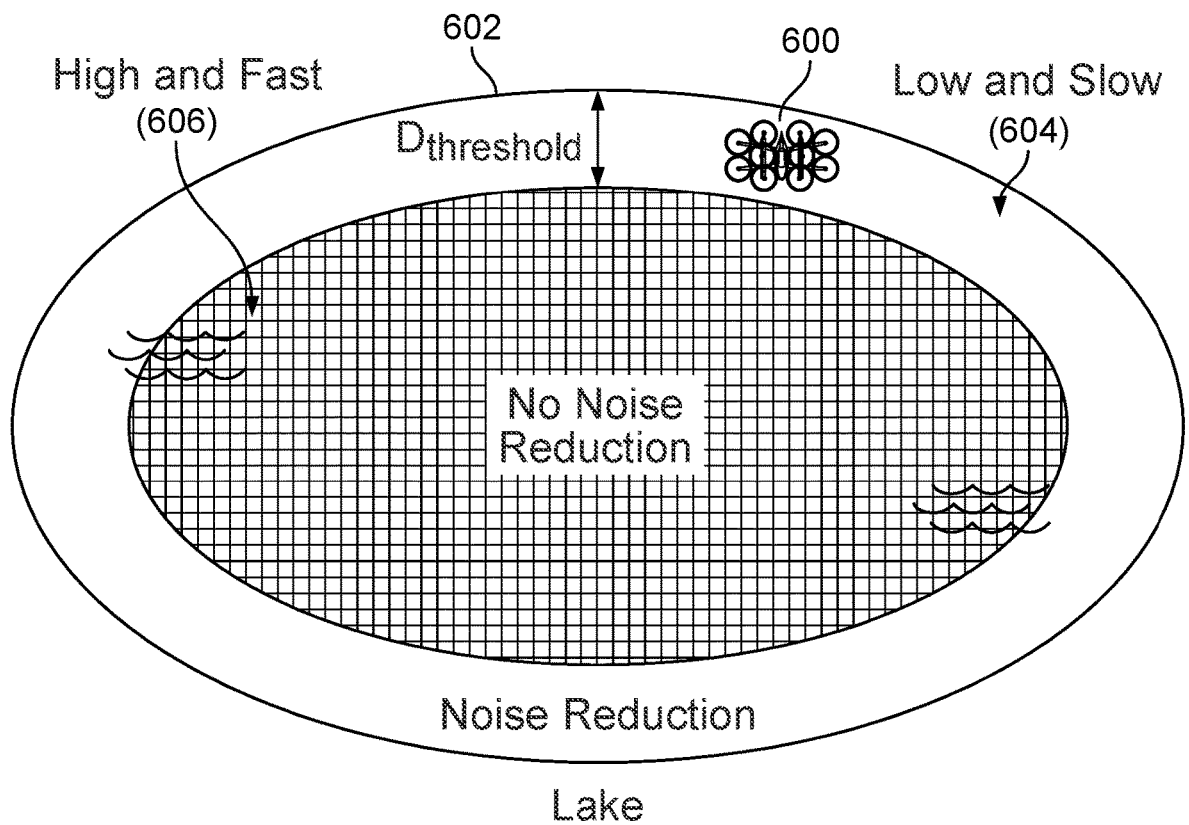
FIG. 6A is a diagram illustrating an embodiment of a lake with a low and slow zone and a high and fast zone.

FIG. 6A is a diagram illustrating an embodiment of a lake with a low and slow zone and a high and fast zone. In this example, a multicopter (600) takes off from, flies over, and lands on a lake (602). Note, for example, that the exemplary multicopter shown in FIG. 1 has floats (112 and 114) which provide sufficient buoyancy for the vehicle to float on water, even with an occupant. In this example, a pilot boards and disembarks the multicopter (600) when the vehicle is close to shore (e.g., the multicopters are docked on a pier).

The multicopter in this example is designed for use by inexperienced and/or unlicensed pilots. To ensure that such pilots do not endanger themselves or others, the exemplary multicopter has a number of safety features, including enforcement of a maximum velocity and a maximum altitude depending upon whether the vehicle is in the low and slow zone (604) or the high and fast zone (606). In some embodiments, a zone is a three dimensional space. The low and slow zone (604) is defined as the part of the lake at distances of 0-$D_{threshold}$ from the shoreline and the high and fast zone (606) is at distances beyond that. For example, there may be many people and/or multicopters at or near the shoreline and therefore it may be desirable to enforce more stringent restrictions closer to shore for safety. In contrast, in the middle of the lake there may be fewer people and vehicles and it may be acceptable to loosen the safety restrictions in that part of the lake.

Figure 6B:
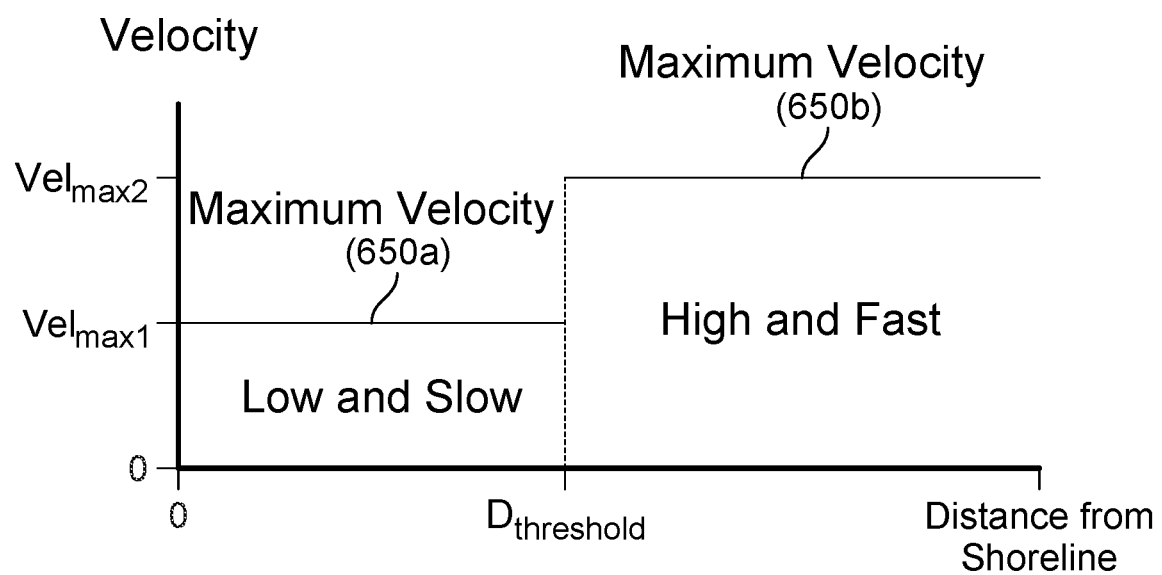
FIG. 6B is a graph illustrating an embodiment of maximum velocities associated with a low and slow zone and a high and fast zone.

FIG. 6B is a graph illustrating an embodiment of maximum velocities associated with a low and slow zone and a high and fast zone. In this example, the maximum velocity function (650a and 650b) shows the maximum velocity that the multicopter automatically enforces depending upon the multicopter's distance from shore (i.e., what zone the vehicle is in). At distances within $D_{threshold}$ from the shoreline when the multicopter is in the low and slow zone, a slower maximum velocity of $Vel_{max1}$ (650a) is enforced. In the high and fast zone at distances that exceed $D_{threshold}$, a faster maximum velocity of $Vel_{max2}$ (650b) applies. If a pilot tries to fly faster than the relevant maximum velocity, the multicopter would simply ignore that input or command and automatically limit the multicopter to the appropriate location-based maximum velocity.

The multicopter similarly enforces (e.g., automatically) a lower maximum altitude in the low and slow zone and higher maximum altitude in the high and fast zone, but the enforcement of a maximum altitude is of less interest for the purposes of noise reduction.

Returning to FIG. 6A, in this example, the multicopter is grounded if the wind is too strong and so the vehicle is assumed to be flying in fair weather. This rule, combined with the lower velocity limit in the low and slow zone (604), means that the multicopter has plenty of control margin in the low and slow zone and therefore it is safe to perform noise reduction in that region without (for example) performing additional, more complicated checks or tests. Also, the low and slow zone (604) is the region where noise reduction is the most desirable because people who complain about noise are most likely to be located on shore as opposed to on the water. As such, in this example, noise reduction (e.g., using deconfliction, phase locked rotors, and/or any combination of the noise reduction techniques described herein) is performed (or at least attempted) in the low and slow zone (604) and is not performed in the high and fast zone (606) because it is assumed that there is sufficient control margin in the low and slow zone but not necessarily in the high and fast zone (e.g., because the multicopter pilot is permitted to fly more faster and/or aggressively in the high and fast zone and prioritizing control margin at the expense of noise reduction in that part of the lake is desirable).

It is noted that this location-based check is not limited to overwater applications, nor is it necessary for a zone to have an automatically-enforced maximum velocity. In some embodiments, (e.g., between steps 300 and 302 in FIG. 3), it is determined if a vehicle is located in a defined space (e.g., within the defined space of the low and slow zone (604) in FIG. 6A), where it is a necessary condition that the vehicle be located in the defined space in order for the plurality of motor control signals to be determined based at least in part on the desired forces or moments and taking into account expected rotor noise produced by one or more of rotors (e.g., a necessary condition for step 302 in FIG. 3 to be performed). In the event it is determined that the vehicle is not located in the defined space (at least in this example), the plurality of motor control signals is determined based at least in part on the desired forces or moments and without taking into account expected noise produced by one or more rotors (e.g., bypassing step 302 in FIG. 3 because the necessary location-based condition is not met).

In some embodiments, the defined space is associated with or includes a takeoff and landing area. For example, in some applications a vehicle's expected cruising or forward flight altitude is sufficiently high so that rotor noise is not a concern for people on the ground except for when the vehicle takes off and lands and therefore noise reduction is only performed or attempted at or near the takeoff and landing area. In some embodiments, the defined space is associated with or includes a quiet zone or an area with (more) stringent noise restrictions or a more populated area. For example, outside of such areas it may not be as important to reduce rotor noise so resources are fully directed to maximizing control margin, battery life, or other objectives outside of such areas. In some embodiments, the defined space has a maximum velocity that is automatically enforced therein (e.g., $Vel_{max1}$ (650a) is automatically enforced in the low and slow zone in FIG. 6B) and the automatically-enforced maximum velocity is slower than a second automatically-enforced maximum velocity associated with a second defined space that is mutually exclusive with the defined space (see, e.g., FIG. 6A). As described above, it may be a safe to assume that in the area with a slower automatically-enforced maximum velocity, there is sufficient control margin to do noise reduction.

In some embodiments, (e.g., past) motor control signals are analyzed as part of a necessary condition or check to determine whether to perform (or at least attempted) noise reduction. For example, although this may require more processing power than the location-based example of FIGS. 6A and 6B, this may be a more accurate measurement or test of the vehicle's current state and whether it is safe and/or appropriate to perform noise reduction. The following figure describes an example of this. Naturally, in some embodiments, the set of necessary conditions for noise reduction includes both location-based and an analysis of motor control signals.

Figure 7:
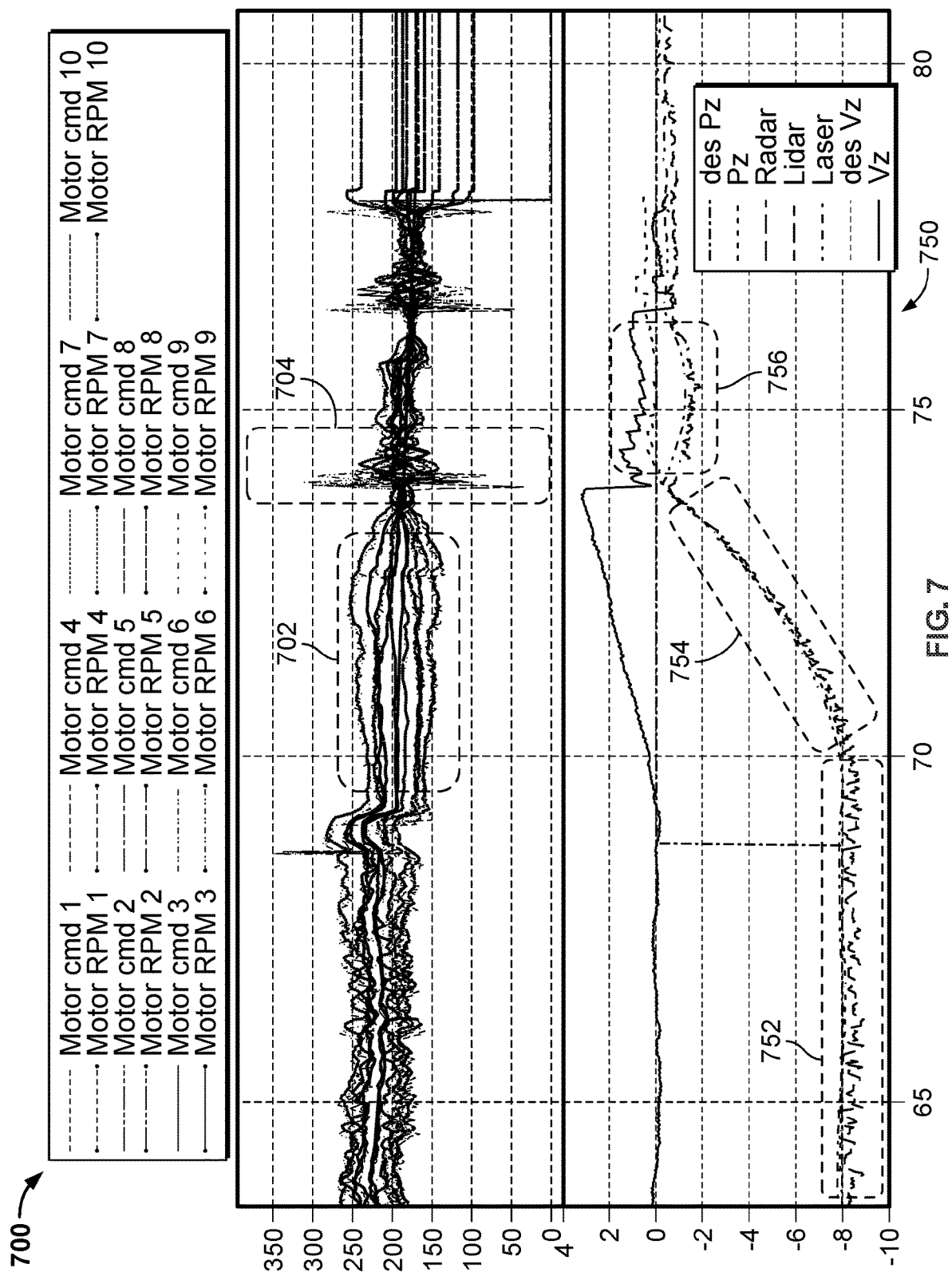
FIG. 7 is a graph illustrating an embodiment of flight data over time.

FIG. 7 is a graph illustrating an embodiment of flight data over time. In the example shown, the top graph (700) shows signals associated with the 10 rotors in a multicopter including the motor commands (i.e., motor control signals) used to control the 10 rotors as well as the rotational speeds (RPM) of the 10 rotors over time.

The bottom graph (750) shows signals associated with the vertical (yaw) axis, including the desired vertical moment (des $P_z$), the actual or produced vertical moment ($P_z$), the altitude of the vehicle measured using radar, lidar, and laser, the desired vertical velocity (des $V_z$), and the actual or produced vertical velocity (Vi) over time. As shown from the altitude of the vehicle measured using radar, lidar, and laser, the multicopter begins at a first altitude during period 752 (e.g., possibly flying in a forward flight mode or hovering in-place at that altitude), gradually descending to a lower altitude during period 754, and then remains at that lower altitude during period 756 (e.g., again possibly flying forward or hovering in-place at that altitude). It is noted that the vertical or z axis is negative-up in this example (e.g., so that −8 m is 8 meters above the surface and 8 m is 8 meters below the surface).

During period 702 in graph 700, the motor control signals are in a relatively steady state, staying relatively constant during that time. In contrast, during period 704, the motor control signals have a high degree of variability, changing values (e.g., relative to its own past values for that motor) and also changing values relative to other rotors (e.g., the motor control signal for one motor may initially be higher than that for another rotor/motor, and then the two signals switch so that the latter motor signal has a greater value). Keeping the aircraft airborne is an important consideration and it may be undesirable to perform noise reduction when the motor controls signals are in a high variability period (e.g., during period 704) because that may indicate a period of time when the multicopter needs all of its resources to be fully directed to flight control. In contrast, steady state period 702 may correspond to or indicate a period of time when it may be safe to perform noise reduction because there are spare resources that are not needed to keep the multicopter safely airborne.

As shown in this example, in some embodiments, a necessary condition for noise reduction (e.g., a check performed between step 300 and 302 in FIG. 3) is whether a moving window of past motor control signals satisfies a steady state criteria (e.g., whether the past motor control signals in the window indicate a sufficiently steady state). For example, a (e.g., statistical) metric indicating or corresponding to a degree of steadiness or variability (e.g., range, variance, standard deviation, etc.) may be generated from the past motor control signals over a (moving) window of time. This metric may be compared against some threshold to determine if the past motor control signals are indicative of a steady state or not. In the event it is determined that the moving window of past motor control signals does not satisfy the steady state criteria, the plurality of motor control signals is determined based at least in part on the desired forces or moments and without taking into account expected noise produced by one or more rotors (e.g., step 302 in FIG. 3 is bypassed because the necessary condition is not satisfied). In some embodiments there are additional necessary conditions that must be satisfied in order for noise reduction to be performed.

In some embodiments, noise reduction (or the analysis, processing, and/or resulting rotor outputs) consumes a not-insignificant amount of power and the vehicle is battery powered. In some embodiments, it is a necessary condition that the battery level satisfies some minimum battery level (e.g., a check performed between step 300 and 302 in FIG. 3). If the minimum battery level is not met or otherwise exceeded, then the motor control signals are generated without taking into account the expected noise produced by one or more rotors (e.g., bypassing step 302 in FIG. 3).

The techniques described above may be used for autonomous flight applications or piloted flight applications. The following figures describe examples of an autonomous flight architecture and a piloted flight embodiment with specific noise reduction techniques for those applications.

Figure 8A:
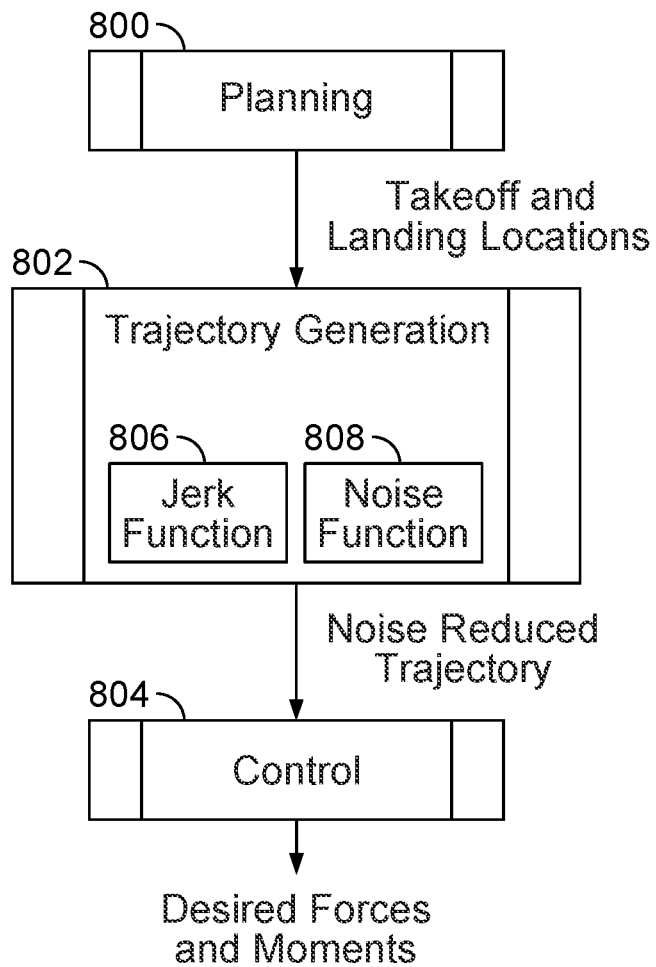
FIG. 8A is a diagram illustrating an embodiment of an autonomous flight control system with noise reduction performed during trajectory generation.

FIG. 8A is a diagram illustrating an embodiment of an autonomous flight control system with noise reduction performed during trajectory generation. In the example shown, the vehicle includes an autonomously flown vehicle and an autonomous flight control system included in the autonomously flown vehicle generates a noise reduced trajectory, including by taking into account expected rotor noise produced by one or more rotors. The autonomous flight architecture shown has three stages or layers: planning (800), trajectory generation (802), and control (804). The planning stage (800) is responsible for obtaining or generating the takeoff and landing locations which are then passed to the trajectory generator (802).

Like the multi-function thrust allocation optimization block (500) in FIG. 5A, the trajectory generator (802) attempts to optimize multiple functions in the process of generating a trajectory (e.g., which may include location information as well as time information, such as what times are associated with what points in the trajectory). In this example, the trajectory generation takes into account a jerk function (806) and a noise function (808) when generating a trajectory based on the takeoff and landing locations that are input to it. For example, it will attempt to generate a trajectory that minimizes jerk as well as noise. Other factors, restrictions, or functions to optimize may also be taken into account, including obstacles, battery life limits or optimization, etc.

The noise reduced trajectory generated by the trajectory generation stage (802) is passed to the control stage (804). The control stage generates desired forces and moments from the trajectory. In some embodiments, some of the technique(s) described above to reduce noise (e.g., FIG. 3 which inputs or otherwise receives desired forces and/or moments) is are used in combination with this noise-reduced autonomous flight control architecture.

Figure 8B:
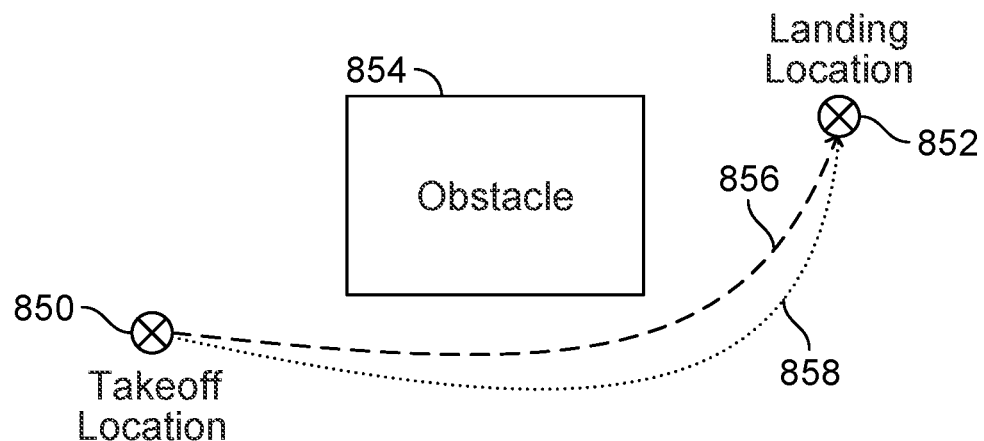
FIG. 8B is a diagram illustrating an embodiment of an autonomous flight trajectory that produces less noise.

FIG. 8B is a diagram illustrating an embodiment of an autonomous flight trajectory that produces less noise. In this example, two exemplary trajectories are shown beginning at the takeoff location (850) and ending at the landing location (852). In this example, there is an obstacle (854) located between the takeoff location and the landing location and so the trajectory generator (e.g., 802 in FIG. 8A) would take this into account when generating the trajectory and generate a trajectory that goes around the obstacle.

The more direct trajectory (856) is an example of a trajectory that is generated without taking into account expected noise and the longer, more roundabout trajectory (858) is an example of trajectory that is generated when (rotor) noise is taken into account or otherwise considered. For example, it may be that the longer trajectory (858) corresponds to rotor behavior or outputs that generate less noise, permit rotor sound waves to (more) destructively combine, permit more control margin which in turn permits more noise reduction, etc.

In some embodiments, the noise-reduced trajectory (e.g., 858) includes ascending to a higher altitude (e.g., compared to noisier trajectory 856) so that the rotor noise is not as audible to people on the ground. For example, since the exemplary multicopter is a VTOL aircraft, a noise-reduced trajectory may include vertically ascending to a sufficiently high altitude, flying in a forward flight mode to the landing location, and then vertically descending to mitigate the noise perceived by people on the ground.

In some embodiments, a noise-reduced trajectory (e.g., 858) includes slower speeds or a longer flight duration compared to a noisier trajectory (e.g., 856). For example, in some cases, by flying at slower speeds may reduce the rotor noise generated.

Figure 9A:
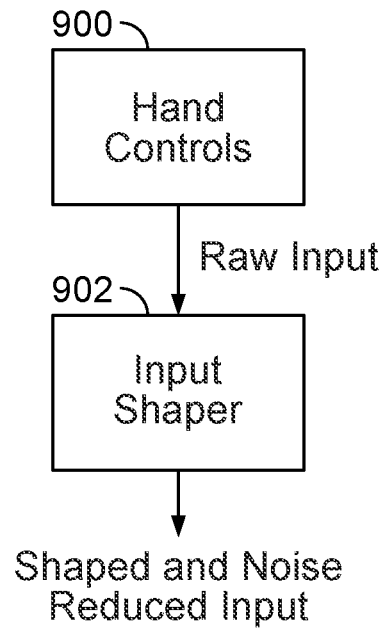
FIG. 9A is a block diagram illustrating an embodiment of components associated with input shaping.

FIG. 9A is a block diagram illustrating an embodiment of components associated with input shaping. In the example shown, the vehicle is a piloted vehicle. The piloted vehicle includes hand controls (900) for the pilot to control the vehicle. The hand controls output a raw input signal which is passed to an input shaper (902). As described above, in some applications the exemplary VTOL multicopter is flown by inexperienced and/or unlicensed pilots. To help ensure a safe and comfortable flight, an input shaper (902) is included after the hand controls (900) to shape (e.g., by smoothing) the raw inputs signals from the pilot. For example, if the pilot were to suddenly or abruptly jerk on the hand controls, the input shaper would smooth out that raw input signal so that a gentler and/or smoother input signal is passed to downstream avionics (e.g., a flight controller and/or a thrust allocator) and the vehicle's response is similarly smooth and opposed to jerky, which could be unsafe and/or unnerving. An input shaper may be attractive because it adds an additional level of safety or gentler flight experience and can be easily implemented (e.g., using a low pass filter that filters out high frequency or abrupt changes). A benefit to input shaping is that it may also reduce the noise produced by the rotor (e.g., either directly or indirectly) and so the resulting shaped input signal output by the input shaper (902) is also noise reduced.

Figure 9B:
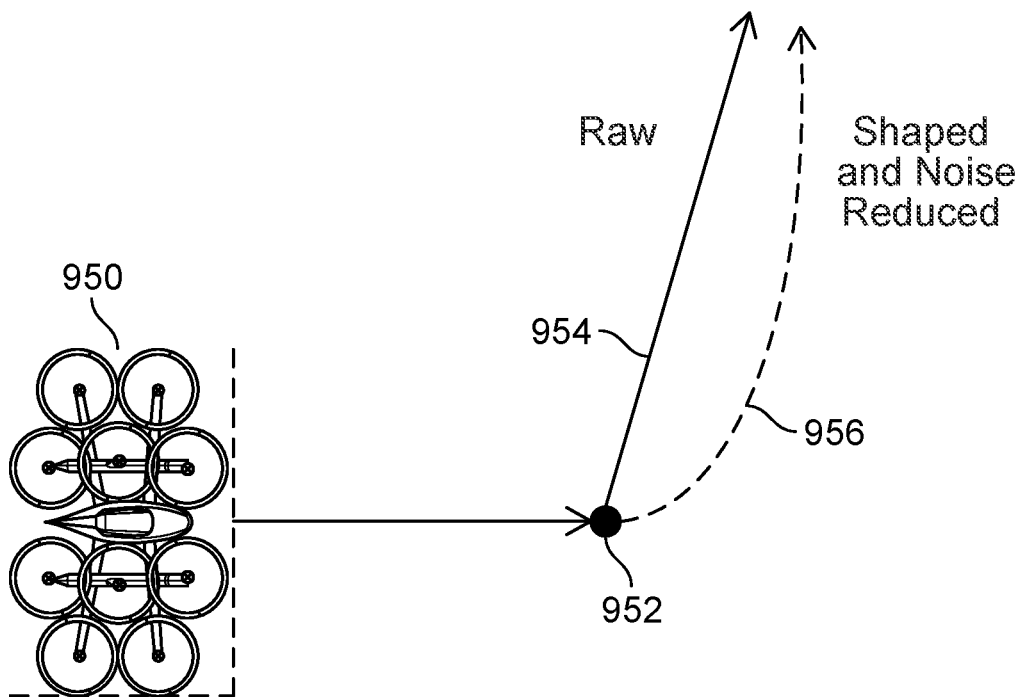
FIG. 9B is a diagram illustrating an embodiment of a flight path corresponding to a shaped and noise reduced input signal.

FIG. 9B is a diagram illustrating an embodiment of a flight path corresponding to a shaped and noise reduced input signal. In this example, a multicopter (950) is flying in a forward flight mode. At point 952, the pilot abruptly yanks on the hand controls to bank the vehicle. Raw path (954) shows conceptually the path corresponding to the raw input signal (e.g., without input shaping or smoothing) and shaped and noise reduced path (956) shows the path corresponding to the shaped and noise reduced input signal. Smoother transitions and/or turns may correspond to rotor outputs and/or behaviors that generate less noise either directly or indirectly (e.g., the shaped input signals allow for more control margin so that more resources may be directed to noise reduction during thrust allocation instead of satisfying a more demanding raw input signal).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A vehicle, comprising:
a flight controller that is configured to:
receive one or more desired forces or moments associated with a plurality of rotors in the vehicle;
determine a plurality of motor control signals for the plurality of rotors based at least in part on the desired forces or moments, including by performing thrust allocation using a feed-forward, multi-function thrust allocation optimization block that finds the plurality of motor control signals that achieve the desired forces and moments and optimize a plurality of cost functions, including a control authority function and a noise function;
determine if a moving window of past motor control signals satisfies a steady state criteria, wherein it is a necessary condition that the moving window of past motor control signals satisfies the steady state criteria in order for the plurality of motor control signals to be determined based at least in part on the desired forces or moments, including by performing thrust allocation using the feed-forward, multi-function thrust allocation optimization block; and
in the event it is determined that the moving window of past motor control signals does not satisfy the steady state criteria, determine the plurality of motor control signals based at least in part on the desired forces or moments and without the feed-forward, multi-function thrust allocation optimization block taking into account the noise function; and the plurality of rotors, wherein the plurality of motor control signals is used to control the plurality of rotors.

2. The vehicle of claim 1, wherein the vehicle includes a vertical takeoff and landing (VTOL) multicopter.

3. The vehicle of claim 1, wherein the flight controller is further configured to:
determine if the vehicle is located in a defined space, wherein it is a necessary condition that the vehicle be located in the defined space in order for the plurality of motor control signals to be determined based at least in part on the desired forces or moments, including by performing thrust allocation using the feed-forward, multi-function thrust allocation optimization block; and
in the event it is determined that the vehicle is not located in the defined space, determine the plurality of motor control signals based at least in part on the desired forces or moments and without the feed-forward, multi-function thrust allocation optimization block taking into account the noise function.

4. The vehicle of claim 1, wherein the flight controller is further configured to:
determine if the vehicle is located in a defined space, wherein:
it is a necessary condition that the vehicle be located in the defined space in order for the plurality of motor control signals to be determined based at least in part on the desired forces or moments and, including by performing thrust allocation using the feed-forward, multi-function thrust allocation optimization block; and
the defined space has a maximum velocity that is automatically enforced and the automatically-enforced maximum velocity is slower than a second automatically-enforced maximum velocity associated with a second defined space that is mutually exclusive with the defined space; and
in the event it is determined that the vehicle is not located in the defined space, determine the plurality of motor control signals based at least in part on the desired forces or moments and without the feed-forward, multi-function thrust allocation optimization block taking into account the noise function.

5. The vehicle of claim 1, wherein the flight controller is further configured to:
determine if a battery level satisfies a minimum battery level, wherein it is a necessary condition that the battery level satisfies the minimum battery level in order for the plurality of motor control signals to be determined based at least in part on the desired forces or moments, including by performing thrust allocation using the feed-forward, multi-function thrust allocation optimization block; and
in the event it is determined that the battery level does not satisfy the minimum battery level, determine the plurality of motor control signals based at least in part on the desired forces or moments and without the feed-forward, multi-function thrust allocation optimization block taking into account the noise function.

6. The vehicle of claim 1, wherein:
the vehicle includes an autonomously flown vehicle; and
an autonomous flight control system included in the autonomously flown vehicle generates a noise reduced trajectory based at least in part on an expected rotor noise produced by at least one of the plurality of rotors.

7. The vehicle of claim 1, wherein:
the vehicle includes an piloted vehicle; and
the piloted vehicle includes a hand control and an input shaper, wherein the input shaper inputs a raw input signal from the hand control that generates a shaped and noise reduced input signal.

8. A method, comprising:
receiving one or more desired forces or moments associated with a plurality of rotors in a vehicle;
determining a plurality of motor control signals for the plurality of rotors based at least in part on the desired forces or moments, including by:
performing thrust allocation using a feed-forward, multi-function thrust allocation optimization block that finds the plurality of motor control signals that achieve the desired forces and moments and optimize a plurality of cost functions, including a control authority function and a noise function;
determining if a moving window of past motor control signals satisfies a steady state criteria, wherein it is a necessary condition that the moving window of past motor control signals satisfies the steady state criteria in order for the plurality of motor control signals to be determined based at least in part on the desired forces or moments, including by performing thrust allocation using the feed-forward, multi-function thrust allocation optimization block; and
in the event it is determined that the moving window of past motor control signals does not satisfy the steady state criteria, determining the plurality of motor control signals based at least in part on the desired forces or moments and without the feed-forward, multi-function thrust allocation optimization block taking into account the noise function; and
controlling the plurality of rotors using the plurality of motor control signals.

9. The method of claim 8, wherein the vehicle includes a vertical takeoff and landing (VTOL) multicopter.

10. The method of claim 8, wherein determining the plurality of motor control signals includes:
determining if the vehicle is located in a defined space, wherein it is a necessary condition that the vehicle be located in the defined space in order for the plurality of motor control signals to be determined based at least in part on the desired forces or moments, including by performing thrust allocation using the feed-forward, multi-function thrust allocation optimization block; and
in the event it is determined that the vehicle is not located in the defined space, determining the plurality of motor control signals based at least in part on the desired forces or moments and without the feed-forward, multi-function thrust allocation optimization block taking into account the noise function.

11. The method of claim 8, wherein determining the plurality of motor control signals includes:
determining if the vehicle is located in a defined space, wherein:
it is a necessary condition that the vehicle be located in the defined space in order for the plurality of motor control signals to be determined based at least in part on the desired forces or moments, including by performing thrust allocation using the feed-forward, multi-function thrust allocation optimization block; and
the defined space has a maximum velocity that is automatically enforced and the automatically-enforced maximum velocity is slower than a second automatically-enforced maximum velocity associated with a second defined space that is mutually exclusive with the defined space; and in the event it is determined that the vehicle is not located in the defined space, determining the plurality of motor control signals based at least in part on the desired forces or moments and without the feed-forward, multi-function thrust allocation optimization block taking into account the noise function.

12. The method of claim 8, wherein determining the plurality of motor control signals includes:

determining if a battery level satisfies a minimum battery level, wherein it is a necessary condition that the battery level satisfies the minimum battery level in order for the plurality of motor control signals to be determined based at least in part on the desired forces or moments, including by performing thrust allocation using the feed-forward, multi-function thrust allocation optimization block; and in the event it is determined that the battery level does not satisfy the minimum battery level, determining the plurality of motor control signals based at least in part on the desired forces or moments and without the feed-forward, multi-function thrust allocation optimization block taking into account the noise function.

13. The method of claim 8, wherein:
the vehicle includes an autonomously flown vehicle; and
an autonomous flight control system included in the autonomously flown vehicle generates a noise reduced trajectory based at least in part on an expected rotor noise produced by at least one of the plurality of rotors.

14. The method of claim 8, wherein:
the vehicle includes an piloted vehicle; and
the piloted vehicle includes a hand control and an input shaper, wherein the input shaper inputs a raw input signal from the hand control that generates a shaped and noise reduced input signal.

15. A computer program product embodied in a non-transitory computer readable medium and comprising computer instructions for:

receiving one or more desired forces or moments associated with a plurality of rotors in a vehicle;

determining a plurality of motor control signals for the plurality of rotors based at least in part on the desired forces or moments, including by:

performing thrust allocation using a feed-forward, multi-function thrust allocation optimization block that finds the plurality of motor control signals that achieve the desired forces and moments and optimize a plurality of cost functions, including a control authority function and a noise function;

determining if a moving window of past motor control signals satisfies a steady state criteria, wherein it is a necessary condition that the moving window of past motor control signals satisfies the steady state criteria in order for the plurality of motor control signals to be determined based at least in part on the desired forces or moments, including by performing thrust allocation using the feed-forward, multi-function thrust allocation optimization block; and in the event it is determined that the moving window of past motor control signals does not satisfy the steady state criteria, determining the plurality of motor control signals based at least in part on the desired forces or moments and without the feed-forward, multi-function thrust allocation optimization block taking into account the noise function; and controlling the plurality of rotors using the plurality of motor control signals.

* * * * *